United States Patent
Gu

(10) Patent No.: US 11,309,555 B2
(45) Date of Patent: Apr. 19, 2022

(54) DEVICE FOR HYDROGEN FUEL CELL SYSTEM AND OPERATION METHOD THEREOF

(71) Applicant: JIANGSU HORIZON NEW ENERGY TECHNOLOGIES CO. LTD., Zhangjiagang (CN)

(72) Inventor: Zhijun Gu, Shanghai (CN)

(73) Assignees: JIANGSU HORIZON NEW ENERGY TECHNOLOGIES CO., LTD., Jiangsu (CN); HYZON MOTORS INC., Honeoye Falls, NY (US)

( * ) Notice: Subject to any disclaimer, the term of this patent is extended or adjusted under 35 U.S.C. 154(b) by 168 days.

(21) Appl. No.: 16/864,502

(22) Filed: May 1, 2020

(65) Prior Publication Data

US 2021/0344024 A1 Nov. 4, 2021

(51) Int. Cl.
*H01M 8/04082* (2016.01)
*H01M 8/04746* (2016.01)

(52) U.S. Cl.
CPC ... *H01M 8/04201* (2013.01); *H01M 8/04753* (2013.01)

(58) Field of Classification Search
CPC ................ H01M 8/04201; H01M 8/04753
See application file for complete search history.

(56) References Cited

U.S. PATENT DOCUMENTS

| 6,182,717 B1 | 2/2001 | Yamashita |
| 2002/0068206 A1 | 6/2002 | Suzuki et al. |
| 2004/0123898 A1* | 7/2004 | Yamashita .......... F16K 31/1635 137/7 |
| 2009/0035612 A1 | 2/2009 | Suematsu et al. |
| 2012/0043221 A1 | 2/2012 | Gu et al. |
| 2012/0060583 A1* | 3/2012 | Pechtold .............. G01L 27/005 73/1.57 |
| 2017/0352903 A1* | 12/2017 | Yoshimura ........ H01M 8/04753 |

FOREIGN PATENT DOCUMENTS

CN 110474071 A 11/2019

* cited by examiner

*Primary Examiner* — Stewart A Fraser
(74) *Attorney, Agent, or Firm* — Jacob M. Ward; Ward Law Office LLC

(57) ABSTRACT

The present invention discloses a hydrogen supply apparatus and a method for operating the apparatus, which can protect a fuel cell and extend the service life of a fuel cell. The hydrogen supply apparatus includes a large-capacity hydrogen storage apparatus, a small-capacity hydrogen storage apparatus, a second shut-off valve, and a pressure reducing valve, etc. The small-capacity hydrogen storage apparatus is automatically filled with fuel gas when the fuel cell is operating, and when the fuel cell is in standby mode, fuel gas is transferred into the fuel cell by controlling the opening and closing time and the period of the second shut-off valve, so that protection of the fuel cell and extension of the fuel cell life are realized.

10 Claims, 2 Drawing Sheets

DEVICE FOR HYDROGEN FUEL CELL SYSTEM AND OPERATION METHOD THEREOF

FIELD

Figure 1:
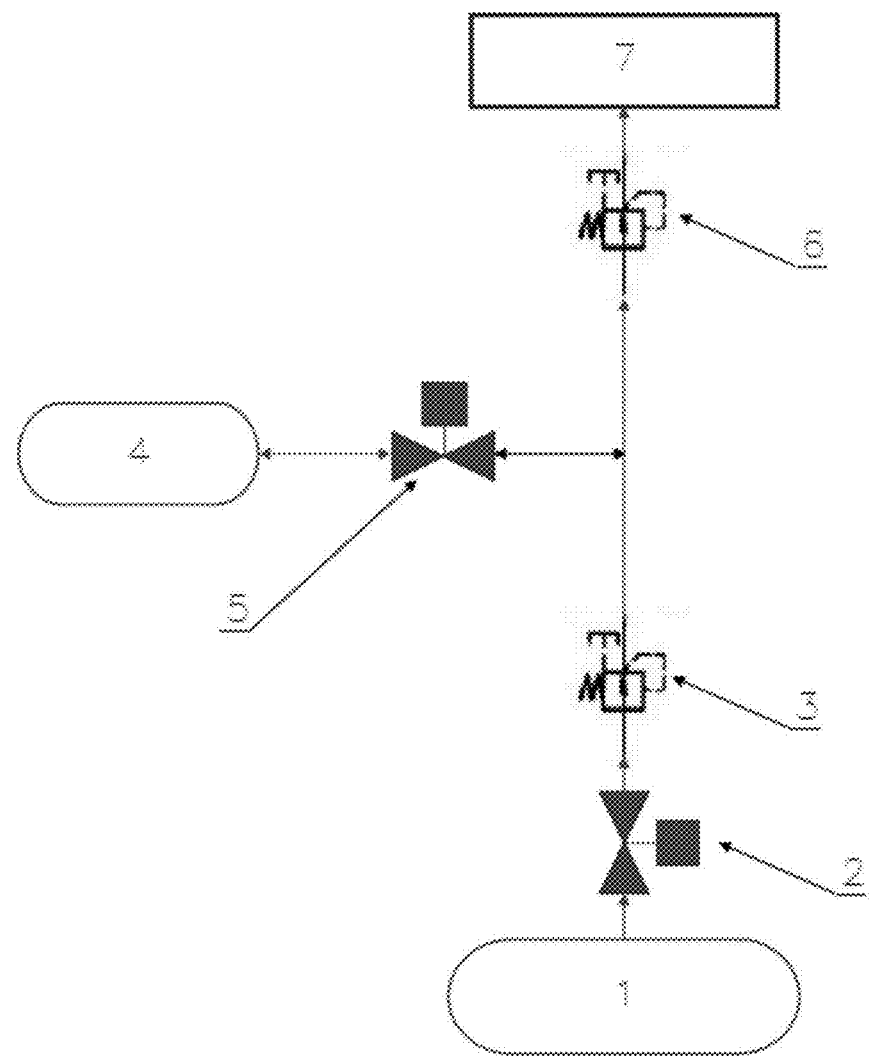

The present invention relates to fuel cell technology, and more specifically, relates to a hydrogen supply apparatus for fuel cell system and a method for operating the apparatus

BACKGROUND

Fuel cells can directly convert hydrogen and oxygen (usually the oxygen in the air) into electricity with relatively high efficiency, and the reaction byproduct is pure water. Therefore, fuel cells can be used for energy saving and environmental protection, etc.

The protection of the fuel cell when the fuel cell system is in standby mode has a great impact on life span of the fuel cell. When the fuel cell system is in standby mode, the external large-capacity hydrogen supply apparatus is closed and is not able to maintain hydrogen supply to the anode. Also, the fuel cell itself is not completely sealed, which results in the hydrogen at the internal anode of the system to be slowly replaced by the air at the cathode.

As a consequence, every time the system restarts, the anode is full of air, and when hydrogen enters into the anode, the life span of the fuel cell will be affected.

Therefore, there is an urgent need in the art to develop a new hydrogen apparatus which is capable of protecting the fuel cell system and extending the life span of the fuel cell.

SUMMARY

In concordance with the instant disclosure, a new hydrogen apparatus which is capable of protecting the fuel cell system and extending the life span of the fuel cell, has been surprisingly discovered.

The purpose of the present invention is to provide a hydrogen supply apparatus which can maintain the internal hydrogen supply for a fuel cell when the fuel cell is in standby mode.

In the present invention, a hydrogen supply apparatus for fuel cells and a method for operating the apparatus are provided according to the present invention.

In a first aspect of the present invention, a hydrogen supply apparatus for fuel cell system is provided according to the present invention. The hydrogen supply apparatus is provided before a fuel cell stack, and the apparatus includes a large-capacity hydrogen storage apparatus, a first shut-off valve, a small-capacity hydrogen storage apparatus, a second shut-off valve and a pressure reducing device; the large-capacity hydrogen storage apparatus is coupled to the first shut-off valve, and the small-capacity hydrogen storage apparatus is provided between the large-capacity hydrogen storage apparatus and the fuel cell stack. The large-capacity hydrogen storage apparatus, the first shut-off valve, the small-capacity hydrogen storage apparatus, the second shut-off valve and the pressure reducing apparatus are coupled to each other through a hydrogen pipeline. The hydrogen storage capacity of the small-capacity hydrogen storage apparatus is less than or equal to one thousandth of the hydrogen storage capacity of the large-capacity hydrogen storage apparatus.

When in use, the pressure of the small-capacity hydrogen storage apparatus is less than the pressure of the large-capacity hydrogen storage tank.

In another preferred embodiment, a first pressure reducing apparatus is provided between the first shut-off valve and the small-capacity hydrogen storage apparatus.

In another preferred embodiment, a second pressure reducing apparatus is provided between the small-capacity hydrogen storage apparatus and fuel cell stack.

Preferably, the large-capacity hydrogen storage apparatus is a high-pressure hydrogen storage tank, and the highest hydrogen storage pressure of the high-pressure storage tank is 35 MPa-70 Mpa.

Preferably, the small-capacity hydrogen storage apparatus is a low-pressure hydrogen storage tank, and the highest hydrogen storage pressure of the low-pressure storage tank is 0.2 MPa to 4 Mpa.

Preferably, the small-capacity hydrogen storage apparatus includes a hydrogen adsorbing material, and the hydrogen adsorbing material is configured to adsorb or release hydrogen when environmental conditions, such as pressure and temperature, etc., change.

In another preferred embodiment, the small-capacity hydrogen storage apparatus includes a filter, and the filter is configured to prevent the hydrogen adsorbing material from entering into the fuel cell stack or the hydrogen pipeline.

In another preferred embodiment, the small-capacity hydrogen storage apparatus and the second shut-off valve are coupled in series and are positioned after the large-capacity hydrogen storage apparatus and the first shut-off valve, and before the fuel cell stack.

In another preferred embodiment, the small-capacity hydrogen storage apparatus and the second shut-off valve are coupled in parallel along the hydrogen pipeline starting from the large-capacity hydrogen storage apparatus to the fuel cell stack and are positioned before the pressure reducing apparatus.

The hydrogen adsorbing material is carbon nano tube or metal hydrogen storage alloy.

The hydrogen adsorbing material is able to adsorb or release hydrogen in a range of minus 30 degrees to 70 degrees above zero The large-capacity hydrogen storage apparatus is configured to supply hydrogen to a primary load, and the small-capacity hydrogen storage apparatus is configured to supply hydrogen as an auxiliary function.

The auxiliary function operates when the primary load is not operating.

In a second aspect of the present invention, a method for operating hydrogen supply apparatus for fuel cells is provided according to the present invention, and the method comprises the following steps of:

(a) providing a fuel cell stack;

(b) providing a hydrogen supply apparatus of claim 1, wherein the small-capacity hydrogen storage apparatus and the second shut-off valve are connected in parallel along the hydrogen pipeline starting from the large-capacity hydrogen storage apparatus to the fuel cell stack and are positioned before the pressure reducing apparatus; wherein the cavity of the small-capacity hydrogen storage apparatus is filled with hydrogen;

(c) simultaneously opening the first shut-off valve and the second shut-off valve, and the high-pressure hydrogen supplying the hydrogen pipeline with hydrogen via the first pressure reducing valve;

(d) operating the fuel cell stack so that the small-capacity hydrogen storage apparatus is filled with hydrogen, and closing the second shut-off valve; and (e) stopping the operation of the fuel cell stack, closing the first shut-off valve, opening the second shut-off valve, and releasing the pure hydrogen in the small-capacity hydrogen storage apparatus.

In a third aspect of the present invention, the invention provides another method for operating hydrogen supply apparatus for fuel cells, and the method comprises the following steps of:

(a) providing a fuel cell stack;

(b) providing a hydrogen supply apparatus of claim 1, wherein the small-capacity hydrogen storage apparatus and the second shut-off valve are coupled in series along the hydrogen pipeline and are positioned after the large-capacity hydrogen storage apparatus and the first shut-off valve, and before the fuel cell stack;

(c) operating the fuel cell stack, simultaneously opening the first shut-off valve and the second shut-off valve, releasing the high-pressure hydrogen in the large-capacity hydrogen storage apparatus to fill the small-capacity hydrogen storage apparatus with hydrogen and supply hydrogen to the fuel cell stack at the same time; and (d) stopping the operation of the fuel cell stack, simultaneously closing the first shut-off valve and the second shut-off valve, and opening the second shut-off valve after a period of time to release the pure hydrogen in the small-capacity hydrogen storage apparatus.

The advantage of the gas supply apparatus and the method for operating the apparatus is that there is no need to introduce other protective gases into the system pipeline, such as nitrogen, etc., so that the complexity and cost of pipeline design are reduced. The use of an additional gas is reduced, and thus the protection of the system is realized with the same gas only.

It should be understood that, within the scope of the present invention, the above technical features of the present invention and the detailed description of the technical features as illustrated below (for instance, the Embodiment) can be combined with each other, and form a new or preferable technical solution. Owing to space reasons, they are not discussed one by one herein for brevity.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

Figure 2:
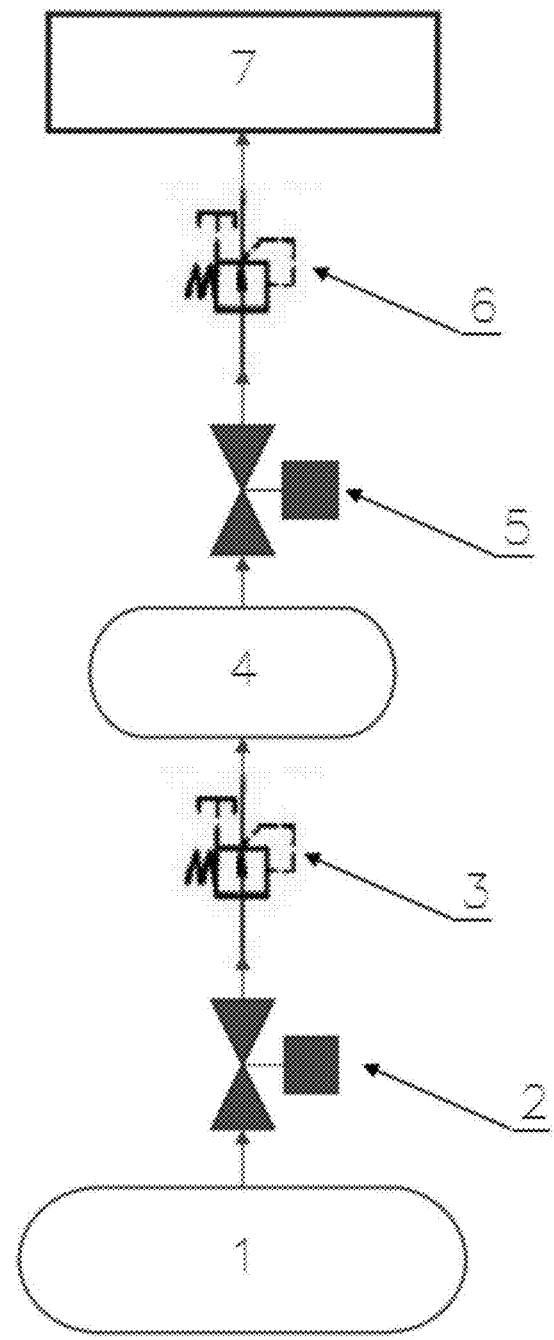

FIG. 1 illustrates a schematic diagram of hydrogen supply apparatus according to an embodiment of the present invention; and FIG. 2 illustrates a schematic diagram of hydrogen supply apparatus according to another embodiment of the present invention.

DETAILED DESCRIPTION

The following detailed description and appended drawings describe and illustrate various embodiments of the invention. The description and drawings serve to enable one skilled in the art to make and use the invention and are not intended to limit the scope of the invention in any manner.

In respect of the methods disclosed, the order of the steps presented is exemplary in nature, and thus, is not necessary or critical unless otherwise disclosed.

After extensive and deep research, for the first time, the inventor of the present invention developed a hydrogen supply apparatus for protecting a fuel cell when the fuel cell is in standby mode. The hydrogen supply apparatus for fuel cells according to the present invention comprises a large-capacity hydrogen storage apparatus and a small-capacity hydrogen storage apparatus, and the small-capacity hydrogen storage apparatus is configured to maintain the internal hydrogen supply to a fuel cell when the fuel cell is in standby mode. In this way, every time the fuel cell restarts, the internal small-capacity hydrogen storage apparatus will be automatically filled by the external large-capacity hydrogen storage apparatus.

Further, during the process when the system waits to restart after shutting down, the internal small-capacity hydrogen storage apparatus will continuously maintain the hydrogen supply to the anode of the fuel cell. Because the fuel cell is located in a relatively confined space, when the system is not operating, the loss of hydrogen is very small. Therefore, the small-capacity hydrogen storage apparatus does not need too much hydrogen and still can maintain a very long standby time. Also, because the amount of hydrogen stored in the hydrogen storage apparatus is very small, the entire system has no potential safety risk. The invention was implemented on this basis.

The main advantages of this invention include the followings:

(a) the system according to the present invention significantly extends the life of a fuel cell, which overcomes the biggest difficulty affecting the life span of a fuel cell which has existed for a long time;

(b) the system according to the present invention does not need to use other gases besides the fuel gas, which avoids repeating the replenishment operations, simplifies the process and reduces the cost; and (c) the system according to the present invention does not require an additional gas supply apparatus, which makes the structural design of the entire fuel cell system simpler and lighter.

Further illustration of the present invention will be made below in connection with the detailed embodiments. It shall be understood that these embodiments are merely used to explain the present invention, and are not intended to limit the scope of the present invention. The experiment approaches among below embodiments that are not indicated with specific conditions shall refer to conventional conditions or conditions suggested by the manufacturer. Unless explained otherwise, a percentage and shares refer to a weight percentage and shares by weight.

It is to be noted that in the claims and specification of the present invention, the relation terms such as "first" and "second", etc., are merely used to distinguish one entity or operation from another, and do not necessarily require or imply that these entities or operations are actually of such relations or sequences.

Moreover, terms "include", "contain" or other variations of such words are intended to cover an non-exclusive inclusion, so that a process, a method, an article or a device which includes a series of elements not only include these elements, but also include other elements that are not explicitly listed, or includes the inherent elements of the process, the method, the article or the device. Without more restrictions, the element defined by the term "include one", does not exclude the existence of other identical elements in the process, the method, the article or the device of the element.

Embodiment 1

As illustrated in FIG. 1, an embodiment of a hydrogen supply apparatus for fuel cell system is shown according to the present invention. The hydrogen supply apparatus is provided before a fuel cell stack 7. The apparatus includes a large-capacity hydrogen storage apparatus 1, a first shut-off valve 2, a first pressure reducing valve 3, a small-capacity hydrogen storage apparatus 4, a second shut-off valve 5 and a second pressure reducing valve 6.

The large-capacity hydrogen storage apparatus 1, the first shut-off valve 2 and the first pressure reducing valve 3 are coupled in sequence. The small-capacity hydrogen storage apparatus 4 and the second shut-off valve 5 are coupled in parallel between the large-capacity hydrogen storage apparatus 1 and the fuel cell stack 7. The second pressure reducing valve 6 is provided between the second shut-off valve 5 and the fuel cell stack 7. T The large-capacity hydrogen storage apparatus 1, the first shut-off valve 2, the first pressure reducing valve 3, the small-capacity hydrogen storage apparatus 4, the second shut-off valve 5, the second pressure reducing valve 6 and the fuel cell stack 7 are coupled through the fluid in the hydrogen pipeline. The large-capacity hydrogen storage apparatus 1 is configured to supply hydrogen to the primary load, the small-capacity hydrogen storage apparatus 4 is configured to supply hydrogen as an auxiliary function, and the auxiliary function operates when the primary load is not operating. Where the fuel cell stack 7 restarts, the internal small-capacity hydrogen storage apparatus 4 will be automatically filled up by the external large-capacity hydrogen storage apparatus 1. Further, during the process when the system waits to restart after shutting down, the internal small-capacity hydrogen storage apparatus 4 will continuously supply the hydrogen to the anode of the fuel cell at a rate that is sufficient to counteract the rate of diffusion of oxygen into the system.

In the branch of the hydrogen passageway, the small-capacity hydrogen storage apparatus 4 and the second shut-off valve 5 are coupled in parallel. When the first shut-off valve 2 and the second shut-off valve 5 are opened simultaneously, the high-pressure hydrogen will supply hydrogen to the main hydrogen passageway and the branch hydrogen passageway via the first pressure reducing valve 3. The parallel connection requires that the cavity of the small-capacity hydrogen storage apparatus 4, before connected to the system, must guarantee to be filled with hydrogen with no air inside.

During the process when the fuel cell stack is operating, the small-capacity hydrogen storage apparatus 4 is filled up at the same time. After the small-capacity hydrogen storage apparatus 4 is filled, the second shut-off valve 5 can be closed even during the operation process. The advantage of this setting is that the small-capacity hydrogen storage apparatus 4 and the second shut-off valve 5 are in the branch passageway which can be opened and closed independently, and where the second shut-off valve 5 is closed the power loss of the system can be reduced. Where the fuel cell stack needs to stop working, there still remains pure hydrogen with certain pressure within a short time after the first shut-off valve 2 is closed.

After a period of time, because of the free diffusion of gas, the hydrogen pressure in the fuel cell stack declines and the purity of hydrogen declines. The impure hydrogen remains in the non-operating fuel cell stack, which will cause fatal damage to the fuel cell stack; while at this time, opening the second shut-off valve 5 and releasing the pure hydrogen from the small-capacity hydrogen storage apparatus 4 will increase the pressure and purity of hydrogen, so that the protection of the fuel cell stack is achieved.

Embodiment 2

As illustrated in FIG. 2, another embodiment which demonstrates a hydrogen supply apparatus for fuel cell system is shown according to the present invention. The hydrogen supply apparatus is provided before a fuel cell stack 7. The apparatus includes a large-capacity hydrogen storage apparatus 1, a first shut-off valve 2, a first pressure reducing valve 3, a small-capacity hydrogen storage apparatus 4, a second shut-off valve 5 and a second pressure reducing valve 6 which are coupled in sequence through the fluid in the hydrogen pipeline.

The large-capacity hydrogen storage apparatus 1 is configured to supply hydrogen to the primary load. The small-capacity hydrogen storage apparatus 4 is configured to supply hydrogen as an auxiliary function, and the auxiliary function operates when the primary load is not operating. Where the fuel cell stack 7 restarts, the internal small-capacity hydrogen storage apparatus 4 will be automatically filled by the external large-capacity hydrogen storage apparatus 1.

Further, during the process when the system waits to restart after shutting down, the internal small-capacity hydrogen storage apparatus 4 will continuously supply the hydrogen to the anode of the fuel cell at a rate that is sufficient to counteract the rate of diffusion of oxygen into the system.

In the main hydrogen passageway, the small-capacity hydrogen storage apparatus 4 and the second shut-off valve 5 are coupled in series. Where the fuel cell stack is to operate, the first shut-off valve 2 and the second shut-off valve 5 need to be opened simultaneously. The high-pressure hydrogen released from the large-capacity hydrogen storage apparatus 1 fills the small-capacity storage apparatus while supplies the required hydrogen to the fuel cell stack at the same time.

The advantage of this method is that the small-capacity hydrogen storage apparatus 4 acts as a buffer in the main hydrogen passageway, and the small-capacity storage apparatus does not need to be filled with hydrogen before connected to the system. Where the first shut-off valve 2 and the second shut-off valve 5 are opened simultaneously, the high-pressure hydrogen released from the large-capacity hydrogen storage apparatus 1 will directly sweep the main hydrogen passageway and the small-capacity storage apparatus, and effluent the miscellaneous gas from the main hydrogen passageway.

Where the fuel cell stack needs to stop working, there still remains pure hydrogen with certain pressure within a short time after the first shut-off valve 2 and the second shut-off valve 5 are closed simultaneously. After a period of time, because of the free diffusion of gas, the hydrogen pressure in the fuel cell stack declines and the purity of hydrogen declines.

The impure hydrogen remains in the non-operating fuel cell stack, which will cause fatal damage to the fuel cell stack; while at this time, opening the second shut-off valve 5 and releasing the pure hydrogen from the small-capacity hydrogen storage apparatus 4 will increase the pressure and purity of hydrogen, so that the protection of the fuel cell stack is achieved.

All literatures mentioned in the present invention are cited in the present application as references, as if each literature is referred to individually as a reference. In addition, it should be understood that after reading the above content of the present invention, a skilled person in this art is able to make various changes or modifications to the present invention. These equivalents also fall within the scope defined by the claims attached to the present application as well.

While certain representative embodiments and details have been shown for purposes of illustrating the invention, it will be apparent to those skilled in the art that various changes may be made without departing from the scope of the disclosure, which is further described in the following appended claims.

What is claimed is:

1. A hydrogen supply apparatus for a fuel cell system, the hydrogen supply apparatus being provided before a fuel cell stack, and the hydrogen supply apparatus comprising:
a large-capacity hydrogen storage apparatus, a first shut-off valve, a small-capacity hydrogen storage apparatus, a second shut-off valve and a pressure reducing apparatus, the large-capacity hydrogen storage apparatus is coupled to the first shut-off valve, and the small-capacity hydrogen storage apparatus is provided between the large-capacity hydrogen storage apparatus and the fuel cell stack,
the large-capacity hydrogen storage apparatus, the first shut-off valve, the small-capacity hydrogen storage apparatus, the second shut-off valve, and the pressure reducing apparatus are coupled to each other through a hydrogen pipeline, and
wherein the hydrogen storage capacity of the small-capacity hydrogen storage apparatus is less than or equal to one thousandth of the hydrogen storage capacity of the large-capacity hydrogen storage apparatus.

2. The hydrogen supply apparatus of claim 1, wherein the pressure of the small-capacity hydrogen storage apparatus is less than the pressure of the large-capacity hydrogen storage tank when in use.

3. The hydrogen supply apparatus of claim 1, wherein a first pressure reducing apparatus is provided between the first shut-off valve and the small-capacity hydrogen storage apparatus.

4. The hydrogen supply apparatus of claim 1, wherein a second pressure reducing apparatus is provided between the small-capacity hydrogen storage apparatus and the fuel cell stack.

5. The hydrogen supply apparatus of claim 1, wherein the large-capacity hydrogen storage apparatus is a high-pressure hydrogen storage tank, and the highest hydrogen storage pressure of the high-pressure storage tank is 35 MPa-70 Mpa.

6. The hydrogen supply apparatus of claim 1, wherein the small-capacity hydrogen storage apparatus is a low-pressure hydrogen storage tank, and the highest hydrogen storage pressure of the low-pressure storage tank is 0.2 MPa to 4 Mpa,
wherein the small-capacity hydrogen storage apparatus includes a hydrogen adsorbing material, and wherein the hydrogen adsorbing material is configured to adsorb or release hydrogen when environmental conditions, such as pressure and temperature, change, and
wherein the small-capacity hydrogen storage apparatus includes a filter, and the filter is configured to prevent the hydrogen adsorbing material entering into the fuel cell stack or the hydrogen pipeline.

7. The hydrogen supply apparatus of claim 1, wherein the small-capacity hydrogen storage apparatus and the second shut-off valve are coupled in series and are positioned after the large-capacity hydrogen storage apparatus and the first shut-off valve, and before the fuel cell stack.

8. The hydrogen supply apparatus of claim 1, wherein the small-capacity hydrogen storage apparatus and the second shut-off valve are coupled in parallel along the hydrogen pipeline starting from the large-capacity hydrogen storage apparatus to the fuel cell stack and are positioned before the pressure reducing apparatus,
wherein the hydrogen adsorbing material is carbon nano tube or metal hydrogen storage alloy, and the hydrogen adsorbing material is able to adsorb or release hydrogen in a range of minus 30 degrees to 70 degrees above zero, and
wherein the large-capacity hydrogen storage apparatus is configured to supply hydrogen to a primary load, and the small-capacity hydrogen storage apparatus is configured to supply hydrogen as an auxiliary function.

9. A method for operating a hydrogen supply apparatus for a fuel cell system, the method comprising the steps of:
providing a fuel cell stack;
providing a hydrogen supply apparatus having a large-capacity hydrogen storage apparatus, a first shut-off valve, a small-capacity hydrogen storage apparatus, a second shut-off valve and a pressure reducing apparatus, the large-capacity hydrogen storage apparatus is coupled to the first shut-off valve, and the small-capacity hydrogen storage apparatus is provided between the large-capacity hydrogen storage apparatus and the fuel cell stack, the large-capacity hydrogen storage apparatus, the first shut-off valve, the small-capacity hydrogen storage apparatus, the second shut-off valve, and the pressure reducing apparatus are coupled to each other through a hydrogen pipeline, wherein the hydrogen storage capacity of the small-capacity hydrogen storage apparatus is less than or equal to one thousandth of the hydrogen storage capacity of the large-capacity hydrogen storage apparatus, wherein the small-capacity hydrogen storage apparatus and the second shut-off valve are coupled in parallel on the hydrogen pipeline starting from the large-capacity hydrogen storage apparatus to the fuel cell stack and are positioned before the pressure reducing apparatus, and wherein the cavity of the small-capacity hydrogen storage apparatus is filled with hydrogen;
simultaneously opening the first shut-off valve and the second shut-off valve, and the high-pressure hydrogen supplying the hydrogen pipeline with hydrogen via the first pressure reducing valve;
operating the fuel cell stack so that the small-capacity hydrogen storage apparatus is filled with hydrogen, and closing the second shut-off valve; and
stopping the operation of the fuel cell stack, closing the first shut-off valve, opening the second shut-off valve, and releasing the pure hydrogen in the small-capacity hydrogen storage apparatus.

10. A method for operating a hydrogen supply apparatus for a fuel cell system, the method comprising the steps of:
providing a fuel cell stack;
providing a hydrogen supply apparatus having a large-capacity hydrogen storage apparatus, a first shut-off valve, a small-capacity hydrogen storage apparatus, a second shut-off valve and a pressure reducing apparatus, the large-capacity hydrogen storage apparatus is coupled to the first shut-off valve, and the small-capacity hydrogen storage apparatus is provided between the large-capacity hydrogen storage apparatus and the fuel cell stack, the large-capacity hydrogen storage apparatus, the first shut-off valve, the small-capacity hydrogen storage apparatus, the second shut-off valve, and the pressure reducing apparatus are coupled to each other through a hydrogen pipeline, wherein the hydrogen storage capacity of the small-capacity hydrogen storage apparatus is less than or equal to one thousandth of the hydrogen storage capacity of the large-capacity hydrogen storage apparatus, and wherein the small-capacity hydrogen storage apparatus and the second shut-off valve are connected in series along the hydrogen pipeline and are positioned after the large-capacity hydrogen storage apparatus and the first shut-off valve, and before the fuel cell stack;

operating the fuel cell stack, simultaneously opening the first shut-off valve and the second shut-off valve, releasing the high-pressure hydrogen in the large-capacity hydrogen storage apparatus to fill the small-capacity hydrogen storage apparatus with hydrogen and supply hydrogen to the fuel cell stack at the same time; and stopping the operation of the fuel cell stack, simultaneously closing the first shut-off valve and the second shut-off valve, and opening the second shut-off valve after a period of time to release the pure hydrogen in the small-capacity hydrogen storage apparatus.

* * * * *